United States Patent
Gallo

(10) Patent No.: US 8,424,239 B1
(45) Date of Patent: Apr. 23, 2013

(54) CODLING MOTH TRAP

(76) Inventor: Jose A. Gallo, Linden, CA (US)

( * ) Notice: Subject to any disclaimer, the term of this patent is extended or adjusted under 35 U.S.C. 154(b) by 267 days.

(21) Appl. No.: 12/924,966

(22) Filed: Oct. 12, 2010

(51) Int. Cl.
*A01M 1/04* (2006.01)
*A01M 1/22* (2006.01)

(52) U.S. Cl.
USPC .............................................. 43/112; 43/113

(58) Field of Classification Search ............. 43/112, 43/113
See application file for complete search history.

(56) References Cited

U.S. PATENT DOCUMENTS

| | | | |
|---|---|---|---|
| 2,038,719 A * | 4/1936 | Davidson | 43/112 |
| 3,319,374 A * | 5/1967 | Gawne | 43/112 |
| 3,473,251 A * | 10/1969 | Kahn | 43/112 |
| 3,823,506 A * | 7/1974 | Iannini | 43/112 |
| 3,835,577 A * | 9/1974 | Soulos | 43/112 |
| 3,950,886 A * | 4/1976 | Newhall et al. | 43/112 |
| 3,968,590 A * | 7/1976 | Kitterman | 43/114 |
| 4,109,408 A * | 8/1978 | Yavnieli | 43/112 |
| 4,182,069 A * | 1/1980 | DeYoreo | 43/112 |
| 4,226,043 A * | 10/1980 | Peterson | 43/112 |
| 4,248,005 A * | 2/1981 | Hedstrom | 43/112 |
| 4,300,306 A * | 11/1981 | Hudgin | 43/112 |
| 4,366,643 A * | 1/1983 | Boaz | 43/113 |
| 4,387,529 A * | 6/1983 | Hedstrom | 43/112 |
| 4,400,903 A | 8/1983 | Seidenberger | |
| 4,454,677 A * | 6/1984 | Chuang | 43/112 |
| 4,490,937 A * | 1/1985 | Yavnieli | 43/112 |
| 4,523,404 A * | 6/1985 | DeYoreo | 43/112 |
| 4,603,505 A * | 8/1986 | Millard | 43/112 |
| 4,666,767 A * | 5/1987 | Von Kohorn et al. | 43/132.1 |
| 4,754,570 A * | 7/1988 | Bakke | 43/112 |
| 4,785,573 A * | 11/1988 | Millard | 43/112 |
| 4,852,296 A * | 8/1989 | Swanson et al. | 43/112 |
| 4,951,414 A * | 8/1990 | Mewissen | 43/112 |
| 4,962,611 A * | 10/1990 | Millard | 43/112 |
| 5,020,270 A * | 6/1991 | Lo | 43/112 |
| 5,205,064 A * | 4/1993 | Nolen | 43/112 |
| 5,231,790 A * | 8/1993 | Dryden et al. | 43/113 |
| 5,255,468 A * | 10/1993 | Cheshire, Jr. | 43/113 |
| 5,301,458 A * | 4/1994 | Deyoreo et al. | 43/112 |
| 5,515,643 A * | 5/1996 | Lin | 43/112 |
| 5,570,494 A | 11/1996 | Prince, Jr. | |
| 5,595,018 A * | 1/1997 | Wilbanks | 43/112 |
| 5,657,576 A | 8/1997 | Nicosia | |
| 5,799,436 A * | 9/1998 | Nolen et al. | 43/112 |

(Continued)

FOREIGN PATENT DOCUMENTS

GB 2130865 A * 6/1984
GB 2242323 A * 9/1991

(Continued)

*Primary Examiner* — Darren W Ark
(74) *Attorney, Agent, or Firm* — Richard L. Mikesell

(57) ABSTRACT

A black light trap which will kill codling moths and will prevent strikes in apple and pear orchards. The device includes a solar panel that will charge batteries throughout the day and then a timer will turn on the light at night that will attract the codling moth into the zap screen that will kill them. The unit is mounted on a pole that is long enough to place the unit above the tree line so the moths are attracted away from the trees and has an outer screen that has a mesh size large enough to allow a moth to enter the unit, but small enough to keep them trapped long enough so that the moth will be attracted to a killing screen located in the unit and surrounding the light.

5 Claims, 2 Drawing Sheets

U.S. PATENT DOCUMENTS

| | | | |
|---|---|---|---|
| 6,032,406 A * | 3/2000 | Howse et al. ............... 43/112 |
| 6,050,025 A * | 4/2000 | Wilbanks .................... 43/112 |
| 6,055,766 A * | 5/2000 | Nolen et al. ................. 43/112 |
| 6,088,949 A | 7/2000 | Nicosia et al. |
| 6,195,932 B1 * | 3/2001 | Aicher ........................ 43/112 |
| 6,341,444 B1 * | 1/2002 | Cina et al. ................... 43/112 |
| 6,516,558 B1 * | 2/2003 | Lingren et al. .............. 43/107 |
| 6,568,124 B1 * | 5/2003 | Wilbanks .................... 43/112 |
| 6,618,984 B1 | 9/2003 | Li |
| 6,786,001 B1 * | 9/2004 | Piper et al. .................. 43/113 |
| 6,860,061 B2 * | 3/2005 | Nosse et al. ................. 43/113 |
| 6,861,578 B1 | 3/2005 | Jongsma et al. |
| 6,886,292 B2 * | 5/2005 | Studer et al. ............... 43/113 |
| 7,073,287 B2 * | 7/2006 | Lau ............................. 43/112 |
| 7,469,499 B2 | 12/2008 | Nelson et al. |
| 7,516,572 B2 | 4/2009 | Yang et al. |
| 7,832,140 B2 * | 11/2010 | Wilbanks .................... 43/112 |
| 8,109,036 B1 * | 2/2012 | Wilbanks .................... 43/112 |
| 8,136,290 B2 * | 3/2012 | Scholz ........................ 43/113 |
| 8,319,649 B1 * | 11/2012 | Devane ....................... 43/112 |
| 8,327,577 B2 * | 12/2012 | Liang .......................... 43/113 |
| 2003/0061757 A1 * | 4/2003 | Askin .......................... 43/112 |
| 2004/159040 A1 * | 8/2004 | Chen ........................... 43/112 |
| 2005/0172542 A1 * | 8/2005 | Rose ........................... 43/113 |
| 2006/0021274 A1 * | 2/2006 | Chen ........................... 43/112 |
| 2007/0107298 A1 * | 5/2007 | Miao et al. .................. 43/113 |
| 2007/0175085 A1 * | 8/2007 | Chen ........................... 43/112 |
| 2008/0010896 A1 * | 1/2008 | Lin .............................. 43/113 |
| 2008/0134568 A1 | 6/2008 | Cowan et al. |
| 2008/0236028 A1 * | 10/2008 | McBride et al. ............. 43/113 |
| 2009/0277073 A1 * | 11/2009 | Chen ........................... 43/112 |
| 2009/0277074 A1 * | 11/2009 | Noronha ...................... 43/113 |
| 2010/0050499 A1 * | 3/2010 | Liang .......................... 43/113 |
| 2010/0154290 A1 * | 6/2010 | Fisher ......................... 43/114 |
| 2011/0146133 A1 * | 6/2011 | Bunker et al. ............... 43/58 |
| 2012/0180379 A1 * | 7/2012 | Tien ............................ 43/112 |

FOREIGN PATENT DOCUMENTS

| | | | |
|---|---|---|---|
| GB | 2380387 A * | 4/2003 |
| JP | 56110214 A * | 9/1981 |
| JP | 02013340 A * | 1/1990 |
| JP | 03043035 A * | 2/1991 |
| JP | 2002125563 A * | 5/2002 |
| WO | WO 8200567 A1 * | 3/1982 |
| WO | WO 9217060 A1 * | 10/1992 |
| WO | WO 9403053 A1 * | 2/1994 |
| WO | WO 2007045879 A1 * | 4/2007 |

* cited by examiner

CODLING MOTH TRAP

TECHNICAL FIELD OF THE INVENTION

The present invention relates to the general art of insect control, and to the particular field of control of Codling Moths.

BACKGROUND OF THE INVENTION

The codling moth (*Cydia pomonella*) is a member of the Lepidopteran family Tortricidae. They are known as an agricultural pest, their larva being the common apple worm or maggot. It is native to Europe and was introduced to North America, where it has become one of the regular pests of apple orchards. It is found almost worldwide. It also attacks pears, walnuts, and other tree fruits. This larva is the famous "worm in the apple" of cartoon and vernacular frame; it is not related to the earthworm.

Codling moths have accounted for more damage to apples then any other pest. Their unique biology combined with their physical attributes makes them forever a formidable foe to anyone that grows apples. Whether one has one tree or an orchard spanning hundreds of acres, codling moths can take away an entire harvest quickly and consistently Codling moths actually don't cause any damage. In fact, like many other insects, it's their larva which do all the bad deeds. Codling moths overwinter in the pupa stage and emerge in the spring when local temperatures are right.

The codling moth is greyish with light grey and copper stripes on its wings, and has an average wingspan of 17 mm. The females lay eggs on fruit or leaves and the black-headed yellow larvae attack the fruit immediately upon hatching. Each larva burrows into the fruit, eats for around three weeks, then leaves the fruit to overwinter and pupate elsewhere. Most nourishment is obtained by feeding on the proteinacous seeds.

The codling moth is bivoltine in most regions of the USA—in the Pacific Northwest there is a partial third generation.

Codling moth adults are about ½ to ¾ inch long with mottled gray wings that are held tentlike over their bodies. Their appearance blends well with most tree bark, making them difficult to detect. The larvae are white to light pink "worms" with a dark brown head. They are one of the few worms that are likely to be found inside pear or apple fruit. Navel orange worms may also be found in walnuts, but these can be distinguished from codling moth larvae by the crescent-shaped markings on the second segment behind the orange worm head and by the excess webbing that they leave in the nut. On apples and pears, larvae penetrate into the fruit and tunnel to the core, leaving holes in the fruit that are filled with reddish-brown crumbly droppings called frass. If left uncontrolled, they can cause substantial damage, often infesting 20 to 90% of the fruit, depending on the variety and location. In walnuts, the larvae feed on the kernels. Nuts damaged early in the season when the nuts are quite small will drop off trees soon after damage occurs. Nuts damaged later in the season will remain on trees, but their kernels are inedible. Walnuts are not as favored a host as apples and pears and untreated trees may incur very little to modest damage (10 to 15% of the nuts), depending on variety and location.

Codling moths overwinter as full-grown larvae within thick, silken cocoons under loose scales of bark and in soil or debris around the base of the tree. The larvae pupate inside their cocoons in early spring and emerge as adult moths mid-March to early April. The moths are only active a few hours before and after sunset and they mate when the sunset temperatures exceed 62° F. After mating each female deposits 30 to 70 tiny, disc-shaped eggs singly on fruit, nuts, leaves, or spurs. After the eggs hatch, young larvae seek out and bore into fruit or developing nuts. After completing development they leave the fruit and drop from the trees to search out pupation sites and continue the life cycle in the soil or on debris under the tree; some crawl back up the tree to pupate in bark crevices. The rate of development will vary with temperature, proceeding more rapidly in warmer weather and climates. Depending on the climate, codling moth can have two, three, and sometimes four, generations per year.

Codling moth can be very difficult to manage, especially if the population has been allowed to build up over a season or two. It is much easier to keep moth numbers low from the start than to suppress a well-established population. In trees with low to moderate levels, codling moth can often be kept to tolerable levels by using a combination of nonchemical management methods; however, it is important to begin implementing these measures early in the season.

Where populations are high and many infested trees are nearby, insecticide applications may be necessary to bring populations down to low levels. However, to be effective, the timing of insecticide spray applications is critical and are difficult to time accurately. In most backyard situations, the best course of action may be to combine a variety of the nonchemical and/or low toxicity chemical methods discussed below and accept the presence of some wormy fruit.

There are several known methods of controlling codling moths. These include:

Nonchemical Control

There are several methods for reducing codling moth that do not require the use of insecticides. Selecting varieties that are less susceptible to damage, such as early maturing apples and pears and late leafing walnuts, can greatly reduce the potential for damage.

Once trees are planted, the most effective nonchemical control methods include sanitation, mass trapping, trunk banding, and fruit bagging. All of these methods are described below. Pruning trees to a height where the canopy is easy to reach also will facilitate nonchemical management of this pest.

If a backyard tree or orchard has a very high moth population, it may take several seasons diligently practicing these nonchemical control methods to reduce codling moth damage to about 10 to 20% of fruit infested. Nearby orchards or backyard trees in which no control program is in place can serve as a continual source of codling moths, thus making it even more difficult to limit damage through nonchemical means alone.

Sanitation.

Sanitation should be the first step in any codling moth control program and it is even more important for those wishing to use primarily nonchemical management approaches. Combining sanitation with mass trapping (see below) may be all that is required in an isolated site with low codling moth populations. However, in areas with high populations or nearby unmanaged host trees, sanitation will probably need to be combined with more aggressive methods to achieve satisfactory control.

Every week or two, beginning about 6 to 8 weeks after bloom, the fruit on trees must be checked for signs of damage. Infested fruit must be removed and destroyed or ones showing frass-filled holes. Removing infested fruit before the larvae are old enough to crawl out and begin the next generation can be a very effective method for reducing the population. Thinning out the infested fruit has the added benefit of encouraging the remaining fruit on the tree to grow larger. It may also improve spray coverage, if sprays are used.

It is also important to clean up dropped fruit as soon as possible after they fail because dropped fruit may have larvae in them. Removing infested fruit from the tree and promptly picking up dropped fruit from the ground is most critical in May and June, but should continue throughout the season.

Mass Trapping.

Hanging traps in each susceptible fruit or nut tree can help to reduce codling moth populations but won't completely eliminate damage. This method works best where trees are isolated from other trees harboring codling moth (apple, pear, English walnut). It should be used in combination with sanitation and other control methods for the best effect.

Codling moth traps are available from many commercial sources, such as hardware stores, garden centers, or online. These traps usually have a sticky cardboard bottom and are baited with a pheromone (sex attractant) lure. The lure mimics the scent of a female moth, attracting males to the trap. Capturing the males reduces mating and the number of eggs that are laid.

A homemade bait trap generally includes a 1-gallon plastic milk jug containing the following: 1 cup cider vinegar, ⅓ cup dark molasses, ⅛ teaspoon ammonia, and enough water to make 1½ quarts of liquid. Cut a 2-inch diameter hole just below the shoulder of the jug. Leave the cap on the jug. The jug is hung in the tree using a wide strip of cloth to disperse the weight of the jug and protect the tree branch. As an attractive food source this trap will capture both male and female moths. While research is not available on the effectiveness of these traps, backyard gardeners have reported success with this method. Up to 3 of these bait traps can be used per large tree and can be used in combination with the other bait and pheromone traps in the same tree to maximize capture.

Trunk Banding.

A traditional, nonchemical method for controlling codling moth is to trap mature larvae in a cardboard band as they climb the trunk seeking a place to pupate. Banding works best on smooth-barked varieties such as Red Delicious apple, which don't provide good alternative pupation sites; scaly-barked varieties like Newtown Pippin and most types of pears have so many crevices on the trunk that many larva will pupate before they get to the banded area. Even in the best situations, banding will only control a very small percentage of the codling moths because many pupate elsewhere on the tree or in the ground. This is the least effective of the nonchemical control measures and is best used as a supplement to sanitation and mass trapping to help reduce very high populations.

Bagging Fruit.

Control can also be achieved by enclosing young fruit in bags right on the tree to protect them from the codling moth. This is the only nonchemical control method that is effective enough to be used alone and in higher population situations. However, it is quite time consuming to apply the bags so this method is most manageable on smaller trees with fewer fruit. One may bag all the fruit on the tree or just as many fruit as may be needed. However, any unbagged fruit is likely to serve as a host and increase the pest population so it would be prudent to employ sanitation and mass trapping to keep the population in check. Bagging should be done about 4 to 6 weeks after bloom when the fruit is from ½ to 1 inch in diameter. This technique won't affect the maturity or quality of the fruit, but it will prevent full color development on red varieties. Therefore, some bags should be opened to check for ripeness as harvest time approaches. The bags must be reclosed if the fruit is not ready to harvest to keep them protected from codling moth attack. Other benefits to bagging include protection from sunburn and larger fruit as a result of diligent thinning.

Biological Control.

Although a few predators such as spiders or carabid beetles may feed on codling moth larvae or pupae, naturally occurring biological control is not effective. In commercial orchards, releases of the tiny wasp, *Trichogramma platneri*, has been used successfully to manage codling moth in combination with mating disruption or soft pesticides, but this method has not been tested in backyards.

Chemical Control.

Various chemicals and pesticides have been used in the past, but in addition to being toxic, the prime difficulty in dealing with codling moth infestations using chemicals seems to lie with appropriate timing. The method of calculating 'degree-days' is often used by orchardists to approximate when a particular pest will reach a particular stage of development during a given season. Since stages of insect development are triggered by the accumulation of a certain amount of heat over time, this calculation involves careful tracking of changes in daily temperature. In the case of codling moth, adults emerging from pupae in bark and other overwintering spaces will mate and begin laying eggs soon after petal fall. For a given moth, this migration can take place within a mere two to three hours. Effective control using any method therefore depends crucially on identifying when decisive moments such as these occur.

Traps.

The inventor is aware of at least one mechanical trap for codling noths: a Pheromone using trap which lures male codling moths inside. Once inside they will get stuck on the inserted glueboard. Once trapped they are not able to mate with females which will effectively decrease codling moth development in any orchard. Traps are weatherproof and will last several months. However, the pheromone is only active for about 1 month so the whole trap should be replaced monthly. Traps are generally placed in the tree. The moth has thus already entered the tree when the trap becomes effective.

There is a need for a means for controlling codling moths in a way which attracts the moths away from the trees to be protected and in a manner which is efficient and requires the least amount of maintenance.

SUMMARY OF THE INVENTION

The above-discussed disadvantages of the prior art are overcome by a black light trap which will kill the codling moth and will prevent strikes in apple and pear orchards. The device includes a solar panel that will charge batteries throughout the day and a timer that will turn on the light at night that will attract the codling moth into the electrified screen which will kill them. The unit is mounted on a pole that is long enough to place the unit above the tree line so the moths are attracted away from the trees and has an outer screen that has a mesh size large enough to allow a moth to enter the unit, but small enough to keep them trapped long enough so that the moth will be attracted to the killing screen located in the unit and surrounding the light.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURE

The invention can be better understood with reference to the following drawing and description. The components in the figure are not necessarily to scale, emphasis instead being placed upon illustrating the principles of the invention. Moreover, in the figure, like referenced numerals designate corresponding parts throughout the view.

DETAILED DESCRIPTION OF THE INVENTION

Referring to the figures, it can be understood that the present invention is embodied in a unit 10 for trapping and killing codling moths which are attracted to trees, which can be a fruit tree, such as an apple tree, or the like and which will ruin the fruit on those trees. Unit 10 is located adjacent to and spaced apart from the tree so the moths will be attracted away from the trees.

Figure 1:
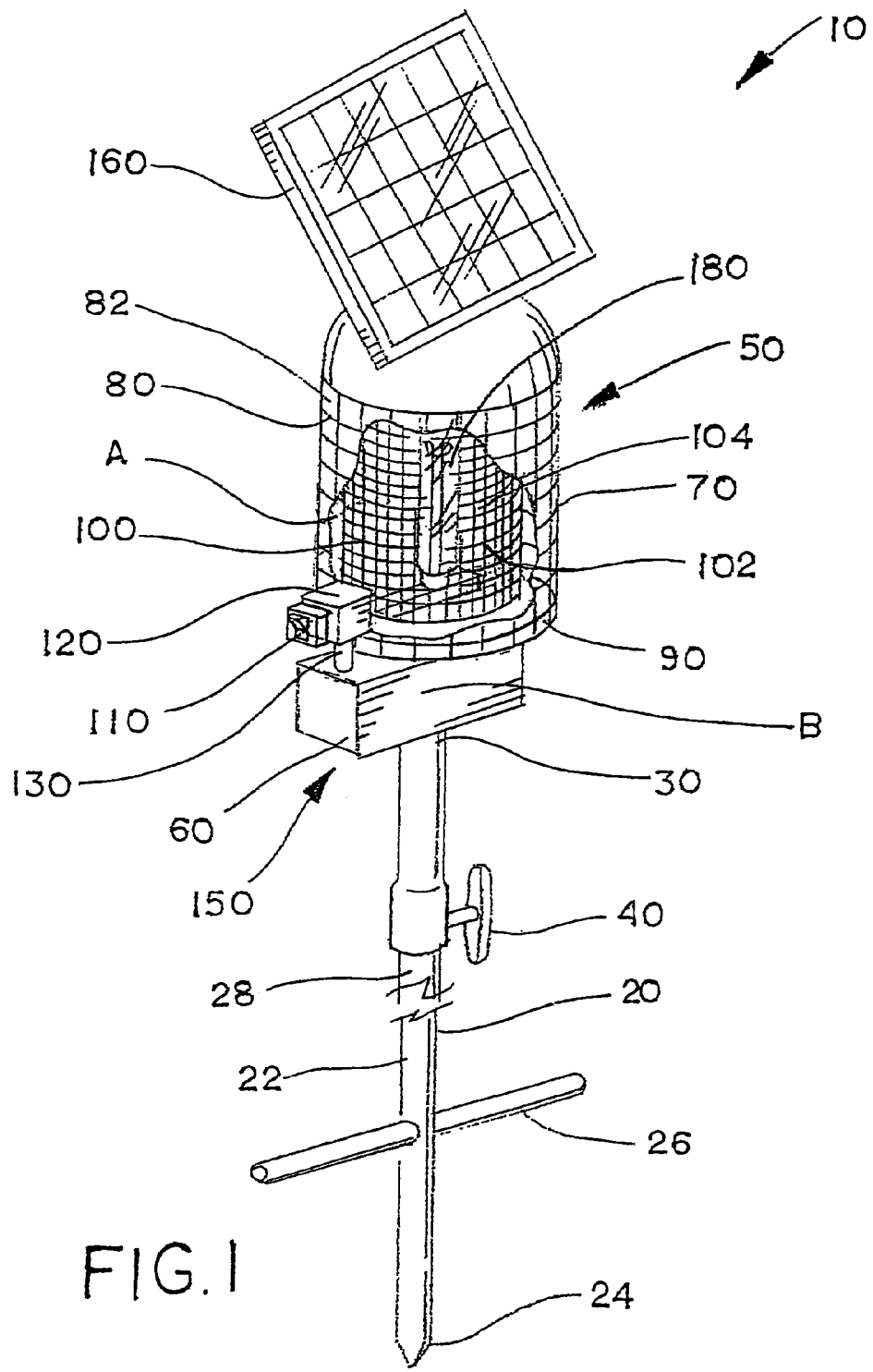
FIG. 1 is a perspective view of a codling moth trap embodying the present invention.
Figure 2:
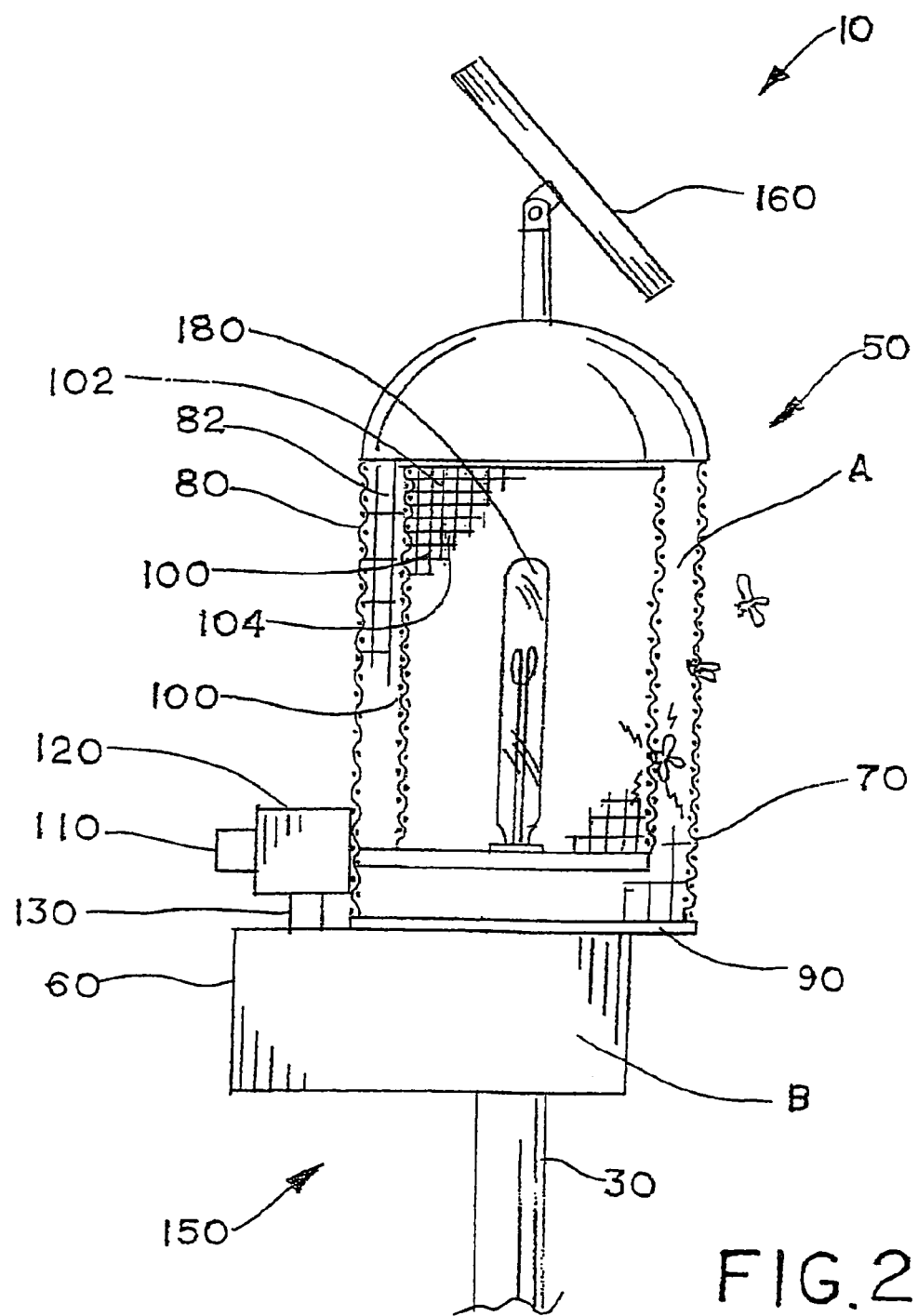
FIG. 2 is a cut-away view of the top portion of the trap showing the interior black light.

Unit 10 comprises a support pole 20 which is at least 4 feet tall, but can be as tall as desired and as necessary to located that top of the pole above the level of tree tops of the trees in the vicinity of the unit as such high placement will attract the moths away from the trees as will be understood from the teaching of this disclosure. support pole 20 includes a first portion 22 having a distal end 24 which is located in the ground when in use, with the support pole being shown in a use orientation in FIG. 1. A foot pedal 26 is located on the first portion of the pole adjacent to the distal end for forcing the distal end of the pole into the ground. Pole 20 further includes a second portion 28 which has a top end 30 and which is telescopingly attached to the distal portion whereby the support pole can be extended beyond four feet so the top end of the second portion can be located above tree top level of any trees located in the vicinity of the unit and the unit can be located adjacent to and spaced apart from trees in the vicinity of the unit. A coupling element 40 couples the first and second portions of the support pole together.

A codling moth trap and killing unit 50 is mounted on the top end of the second portion of the support pole to be located above tree top level and includes a battery compartment 60 which contains a rechargeable battery B and which is fixed to the top end 30 of the support pole.

A cage unit 70 is fixed to the battery compartment and includes an outer wall 80 formed of screen 82 having a mesh size of between 1 mm×4 mm and 3 mm×8 mm whereby a codling moth can pass through the outer wall and into area A surrounded by the outer wall but will have difficulty passing out of the area surrounded by the outer wall once it is inside that area. The inventor has determined that this mesh size is ideal to allow the codling moth to enter the cage area but will keep the moth inside the caged area long enough for it to be attracted to the killing screen which is located in the area surrounded by the outer wall. The killing screen will be discussed below. A bottom wall 90 is attached to the battery compartment and the outer wall is mounted on the bottom wall.

An inner cage unit 100 is the killing screen and is located inside the area surrounded by the outer wall and is formed by a screen 102 having a mesh 104 which has a size smaller than the mesh size of the outer wall.

A control switch 110 has an "on" position and an "off" position and is included in the trap and killing unit.

A timer 120 is connected to the control switch to move the control switch between the on and off positions according to pre-set times so the control switch can be moved into the on position when codling moths are most likely to be in the vicinity of the unit.

An electric coupling 130 is electrically coupled to the battery compartment and to the inner cage to electrify the inner cage when the control switch is in the on position.

A power unit 150 includes rechargeable battery B located in the battery compartment and a solar battery charger 160 mounted on the trap and killing unit and electrically coupled to the battery to recharge that battery. Solar charger 160 has electronic circuitry and elements known to those skilled in the art. The details of the solar charger are not important to this invention and thus will not be discussed or claimed.

A black light 180 is located in the trap and killing unit to attract coddling moths to the trap and killing unit and is connected to the timer to be activated when codling moths are most likely to be present. Preferably, the black light is located inside the killing screen.

Codling moths are controlled by locating at least one unit 10, and more preferably, a plurality of units, adjacent to and spaced apart from trees to attract codling moths away from the trees. The support poles of the units are extended to locate the trapping and killing units above tree top level where the units will be most effective as they will not be blocked by the trees. The timer of each unit is set to activate the electrified inner cage and the backlight at a time when codling moths are most likely to be present and to de-activate the unit at other times to conserve power. The rechargeable battery, or batteries, are powered by solar power to remain charged at a level sufficient to operate unit 50. The solar recharging feature allows the unit or units to be placed and forgotten so they will provide the maximum protection for as large an area as possible with the minimum of maintenance being required.

While various embodiments of the invention have been described, it will be apparent to those of ordinary skill in the art that many more embodiments and implementations are possible within the scope of this invention. Accordingly, the invention is not to be restricted except in light of the attached claims and their equivalents

What is claimed is:

1. A unit for trapping and killing codling moths comprising:
   A) a support pole which is at least 4 feet tall so the unit can be located adjacent to and spaced apart from trees in a vicinity of the unit;
   B) a codling moth trap and killing unit mounted on the support pole to be located above tree top level and which includes
      (1) a battery compartment fixed to a top end of the support pole,
      (2) a cage unit fixed to the battery compartment and including
         (a) an outer wall formed of screen having a mesh size of between 1 mm×4 mm and 3 mm×8 mm whereby a codling moth can pass through the outer wall and into an area surrounded by the outer wall but will have difficulty passing out of the area surrounded by the outer wall once it is inside the area,
         (b) a bottom wall attached to the battery compartment and on which the outer wall is mounted, (c) an inner cage unit located inside the area surrounded by the outer wall and formed by a screen having a mesh size smaller than the mesh size of the outer wall, (d) a control switch having an on position and an off position, (e) a timer connected to the control switch to move the control switch between the on and off positions according to pre-set times so the control switch can be moved into the on position when codling moths are most likely to be in the vicinity of the unit, and (f) an electronic coupling electronically coupled to the battery compartment and to the inner cage to electrify the inner cage when the control switch is in the on position;

C) a power unit which includes
  (1) a rechargeable battery located in the battery compartment, and
  (2) a solar battery charger mounted on the trap and killing unit and electrically coupled to the battery to recharge the battery; and D) a black light located in the trap and killing unit to attract codling moths to the trap and killing unit.

2. The unit defined in claim 1 wherein the support pole is less than or equal to six feet in length when the second portion is fully extended from the first portion.

3. A unit for trapping and killing codling moths comprising:

A) a support pole which is at least 4 feet tall and includes
  (1) a first portion having a distal end which is located in the ground when in use,
  (2) a foot pedal on the first portion of the pole adjacent to the distal end for forcing the distal end of the pole into the ground,
  (3) a second portion which has a top end and which is telescopingly attached to the first portion whereby the support pole can be extended beyond four feet so the top end of the second portion can be located above tree top level of any trees located in a vicinity of the unit and the unit can be located adjacent to and spaced apart from trees in the vicinity of the unit, and
  (4) a coupling element coupling the first and second portions of the support pole together;

B) a codling moth trap and killing unit mounted on the top end of the second portion of the support pole to be located above tree top level and which includes
  (1) a battery compartment fixed to the top end,
  (2) a cage unit fixed to the battery compartment and including
    (a) an outer wall formed of screen having a mesh size of between 1 mm×4 mm and 3 mm×8 mm whereby a codling moth can pass through the outer wall and into an area surrounded by the outer wall but will have difficulty passing out of the area surrounded by the outer wall once it is inside the area,
    (b) a bottom wall attached to the battery compartment and on which the outer wall is mounted,
    (c) an inner cage unit located inside the area surrounded by the outer wall and formed by a screen having a mesh size smaller than the mesh size of the outer wall,
    (d) a control switch having an on position and an off position,
    (e) a timer connected to the control switch to move the control switch between the on and off positions according to pre-set times so the control switch can be moved into the on position when codling moths are most likely to be in the vicinity of the unit, and
    (f) an electronic coupling electronically coupled to the battery compartment and to the inner cage to electrify the inner cage when the control switch is in the on position;

C) a power unit which includes
  (1) a rechargeable battery located in the battery compartment,
  (2) a solar battery charger mounted on the trap and killing unit and electrically coupled to the battery to recharge the battery; and D) a black light located in the trap and killing unit to attract codling moths to the trap and killing unit.

4. The unit defined in claim 3 wherein the support pole is less than or equal to six feet in length when the second portion is fully extended from the first portion.

5. A method of trapping and killing codling moths comprising:

A) providing a trapping and killing unit which has
  (1) a support pole that is at least four feet tall so a top of the support pole will be located above tree top level of any tree in a vicinity of the unit,
  (2) a codling moth trap and killing unit which includes
    (a) an outer wall formed of a screen having a mesh size of between 1 mm×4 mm and 3 mm×8 mm,
    (b) an inner cage located inside the outer wall and being formed by a screen having a mesh size smaller than the mesh size of the outer wall,
    (c) an electronic circuit which includes
      (i) a rechargeable battery,
      (ii) a solar battery charger,
      (iii) a timer, and
      (iv) an on/off switch connected to the timer and connecting the battery to the inner cage to apply voltage to the inner cage when the on/off switch is in an on position, and
    (d) a black light located in the trap and killing unit to attract codling moths to the trap and killing unit; and B) locating the trapping and killing unit adjacent to and spaced apart from at least one tree and attracting codling moths to the unit and away from trees in the vicinity of the unit.

* * * * *